United States Patent Office 3,508,107
Patented Apr. 21, 1970

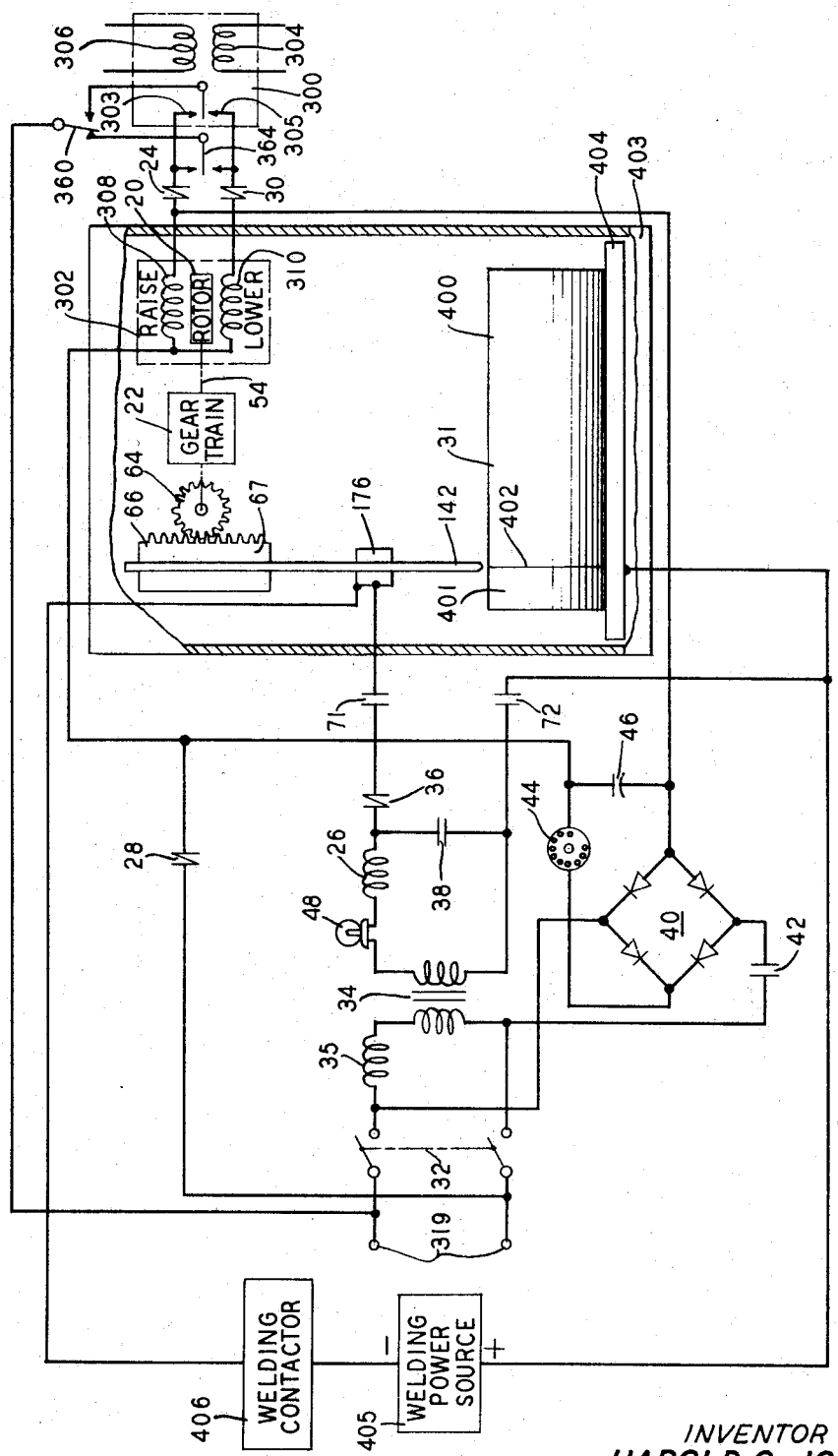

3,508,107
APPARATUS AND METHOD FOR A CLOSED
VESSEL WELDING OPERATION
Harold O. Jones, Landing, N.J., assignor to Air Reduction Company, Incorporated, New York, N.Y., a corporation of New York
Filed Nov. 21, 1966, Ser. No. 595,860
Int. Cl. B23k 9/12
U.S. Cl. 314—73                                    6 Claims

ABSTRACT OF THE DISCLOSURE

Apparatus and method for remote control of the spacing between a welding electrode and a workpiece in a closed vessel comprising means for moving the electrode toward the workpiece, means responsive to electrical contact between the electrode and workpiece to stop movement of the electrode, means to indicate contact, and means including a dial-type selector switch for moving the electrode a predetermined distance away from contact with the workpiece.

---

This invention relates to means and a method of controlling and adjusting the spacing between two members, more particularly a welding electrode and a workpiece from a position out of sight of the members to be spaced.

A specific example of a situation in which a need for the invention arises is where atomic fuel is to be sealed into containers to be inserted into an atomic reactor in order to refuel the reactor, it being necessary to weld a closure member into the container to effect the seal to prevent escape of radioactive material from the container. It is found necessary to carry on the entire welding opertion with the container inside a closed vessel. The welding operator is unable to see the welding electrode or the point on the workpiece where the weld is to be made. He is therefore unable to estimate the distance between the workpiece and the tip of the arc electrode without the assistance of some controlling and manipulating device.

By use of the present invention, the welding operator is enabled to cause the electrode first to move toward the workpiece and touch the same, whereupon forward motion of the electrode stops and the operator is apprised of this event. The operator can then actuate means to move the electrode back a predetermined distance to position the electrode at the desired distance from the workpiece for starting the welding operation, all without visual clues as to the position of the electrode.

Accordingly, an object of the invention is to enable an operator to control and adjust the spacing between two members without the benefit of visual clues as to the relative positions of the members.

A feature of the invention is the use of a selector switch for selecting a desired amount of spacing between the members to be spaced, particularly the use of a telephone type dial switch for the purpose.

The invention is described and shown herein with special reference to its use with the particular means for raising and lowering the arc electrode with respect to the work as described and shown in U.S. Patent No. 3,059,098, issued Oct. 16, 1962 to Nelson E. Anderson and owned by the assignee herein. The invention, however, is not to be construed as being limited to use with the particular means for raising and lowering the arc electrode, as it can be used also with other suitable means for raising and lowering the electrode. The drawing shows only such parts of the disclosure of the above cited Anderson patent as are thought to be necessary or helpful in explaining the relationship of the present invention to the means for raising and lowering the electrode. The parts corresponding to those shown in the Anderson patent are identified by the same reference characters used in the patent. Reference may be made to the said Anderson patent for further details of a suitable means for raising and lowering the electrode.

Other features, objects and advantages will appear from the following more detailed description of an illustrative embodiment of the invention, which will now be given in conjunction with the accompanying drawing, the single figure of which is a schematic diagram of a system for positioning a welding arc electrode with respect to a workpiece, showing the workpiece, the welding tool and means for positioning the welding electrode as being contained in a closed vessel, the latter partly broken away to reveal its contents.

In the figure, a workpiece 31 is shown which may comprise, for example, a cylindrical container 400 for atomic fuel, together with a closure member 401 to be welded to the container 400 at a seam 402 to close the container. Any suitable mechanism may be used to rotate or move the workpiece with respect to the welding head.

The workpiece 31 may be contained within a closed vessel, represented schematically by a box 403, shown partly broken away to reveal its contents, the workpiece preferably being clamped in electrical contact with a base plate 404 which is connected to ground terminal, for example the positive terminal, of a welding power source 405. The other terminal, in this case the negative terminal, of the welding power source is connected by way of a welding contactor 406 to a welding electrode contact tube 176 which latter is in electrical contact with a welding electrode 142.

The invention does not depend upon the particular welding power source used. Either direct current or alternating current welding power may be employed, and in the case of direct current, the polarity may be either straight polarity, as shown, or reverse polarity.

The arc electrode 142 is spaced apart from the workpiece 31, the spacing being under the control of a pinion 64 and a rack 66, the rack being secured to the electrode 142 as by a friction fit between the electrode and a hollow center of the member 67 carrying the rack. The pinion 64 is shown as being driven by a rotor 20 of a bi-directional motor unit 302 through a suitable speed reducing gear train 22, the motor shaft 54 being shown schematically by a broken line connecting the rotor 20 to the gear train 22. The rack 66 etc. may be positioned in the box 403 by means of adjustable arms or any other suitable supporting mechanism. The motor unit 302 has operating windings 308 and 310, one for each direction of rotation of the motor, which windings may be energized by alternating current, as described and shown in the above cited Anderson patent. The motor unit 302 may be controlled automatically as described and shown in the Anderson patent under the control of a differential relay 300 and/or manually by means of a manual transfer switch 364 which is normally open and inoperative. In accordance with the present invention, the motor unit 302 may also be controlled through control circuits shown for the purpose in the figure.

The power for the operating motor unit 302 is obtained from a source of alternating current 319 which may be a commercial power line, typically 110 volts, 60 cycles per second. The source 319 when in use for normal operation of the motor unit 302, either automatically through relay 300 or manually through the transfer switch 364, has one side connected to the switch arm 360 of a selector switch which may have two or more positions, of which for present purposes, only two are significant, one, to the right in the figure, for automatic control and the other, to the left, for manual control.

The switch 360 is shown in the manual position, connected to the manual transfer switch 364. In the upper position of the switch 364, the circuit from the power line 319 is extended through a normally closed contact 24 of a first control relay, the operating winding of which is shown at 26, thence through the raise winding 308 of the motor unit 302, and another normally closed contact 28 of the relay 26, back to the other side of the power line 319. In the lower position of the switch 364, the circuit goes through a normally closed contact 30, controlled by the winding 26, and thence through the lower winding 310 of the unit 302, and the normally closed contact 28. By operating the switch 364 manually, the electrode 142 can be raised or lowered as desired.

When the switch 360 is placed in the automatic position, the power is taken off the switch 364 and connected to a transfer switch in the relay 300 wherein under the control of windings 304 and 306 the power is automatically connected through a contact 303 to the raise winding 308 or through a contact 305 to the lower winding as needed in a system of automatic control of arc length as described and shown in the above cited Anderson patent. In the figure, the power for automatic arc length control follows the same paths as in the case of manual operation.

For the purpose of positioning the arc electrode 142 with respect to the workpiece 31, to obtain a precise predetermined spacing therebetween, particularly under conditions where it is not possible to see the electrode tip or the work, the following arrangements are provided in accordance with the invention. Power from the line 319 or other suitable source is connected through a switch 32 and a winding 35 of a second control relay and the primary winding of a voltage step-down transformer 34, if required, to provide alternating current at suitable voltage energizing the control relay winding 26.

A circuit from one side of the secondary winding of the transformer 34 extends by way of an indicator lamp 48, the control winding 26, a normally closed contact 36 controlled by the winding 26, and a normally open contact 71 controlled by the winding 35 to the contact shoe 176 in electrical contact with the welding electrode 142. A circuit from the other side of the secondary winding of the transformer 34 extends by way of a normally open contact 72 controlled by the winding 35 to the base plate 404 in electrical contact with the workpiece 31. A normally open, holding contact 38 controlled by the winding 26 bridges across the contacts 36, 71 and 72, the shoe 176, the electrode 142 and the arc gap between the electrode 142 and the workpiece 31.

It will be noted that the control circuits are protected from the welding power circuit by the normally open contacts 71 and 72 which operate under the control of the control relay winding 35 to open when the switch 32 is opened to remove the power in line 319 from the control relay winding 26. For safety considerations, the welding contactor 406 and the switch 32 may be interlocked to prevent contractor 406 from closing until switch 32 has been opened.

Power from the line 319 under the control of the switch 32 is also extended to a full-wave rectifier 40, shown as a bridge circuit of diodes, in series with a normally open contact 42 controlled by the relay winding 26. The rectified output current from the rectifier 40 when contact 42 is closed is provided with a circuit through a stepping switch 44, which may be a telephone dial switch, and through the raise winding 308. A smoothing capacitor 46 may be provided in parallel connection to the winding 308.

It will be noted that the stepping switch 44, indicator lamp 48, switch 364, switch 32 and other elements of the controls for positioning the electrode may be placed at a considerable distance from vessel containing the electrode and workpiece, for the protection of the operator, notably when the workpiece may be radioactive.

In the operation of the system disclosed, in positioning the electrode 142 with respect to the work 31 without visual clues, the selector switch 360 is placed in the manual position and the switch 32 is placed in the closed position. The closing of switch 32 energizes winding 35, causing contacts 71 and 72 to close. In the general case, the electrode 142 is not touching the work 31 and the circuit for the relay winding 26 is open at the gap between the electrode and the work. The transfer switch 364 is now moved manually to the electrode lowering position and held there for the time being. Alternating current from line 319 flows through the switch 360, the contact 30, the winding 310 of the motor unit 302 and the contact 28, turning the rotor 20 in the proper direction to lower the electrode 142 toward the work 31. When the electrode 142 touches the work 31, a circuit is completed for the control relay winding 26 from the transformer 34, through the contact 36, the now closed contacts 71 and 72, and the indictor lamp 48, energizing the winding 26 and lighting the lamp. The control relay is so adjusted that energizing the winding 26 closes the contact 38 to hold the relay in th operated condition before it opens the contact 36. The energizing of the winding 26 also opens the contacts 24, 30 and 28 disabling for the time being both the manual control of the electrode by means of the transfer switch 364 and the automatic control of the electrode by means of the differential relay 300. The lighting of the lamp 48 informs the operator that the electrode 142 is in contact with the work 31, whereupon he can return the switch 364 to the neutral position. The contact 30 is made fast opening so that it is effective to stop the advance of the electrode by breaking the circuit of the winding 310 upon contact of the electrode with the work. As described and shown in the above cited Anderson patent, the motor unit 302 is preferably of the type which stops with effectively no inertia or over-run when the current circuit to the motor control winding is broken. The energizing of the winding also closes the contact 42, extending power to the rectifier.

The closing of the contact 42 when the control relay 26 is energized connects the rectifier 40 to the line 319, providing a suitable source of direct current for operating the stepping switch 44. The operator, upon seeing the lamp 48 light, can now dial for any desired number of upward steps of the electrode 142 by dialing numbers on the telephone dial switch 44. This switch sends pulses through the raise winding 308 to operate the motor unit 302 to raise the electrode to the precise position desired, as for starting a welding operation. When the electrode has been positioned as desired, the switch 32 may be opened to de-energize the control relays 26 and 35 and restore the system to the control of either the manual transfer switch 364 or the differential relay 300. The deenergizing of the control relays effects this result by closing the contacts 24, 30 and 28, and also restores the contact 36 to the normally closed condition and the contacts 38, 42, 71 and 72 to the normally open condition, ready for future use. The opening of the switch 32 incidentally extinguishes the indicator lamp 48.

When the switch 32 has been opened, the welding contactor 406 may be closed to impress welding power between the electrode 142 and the workpiece 31 to start the desired welding operation, the spacing between the electrode and the work having been correctly set by the operator by use of the invention, even through the operator cannot see either the electrode or the workpiece and so cannot judge the spacing between them.

In a welding operation using a tungsten electrode, a suitable unit of distance in withdrawing the electrode from the work is 0.005 inch per direct current impulse through the stepping switch 44. By means of the telephone dial type of stepping switch, from one to ten impulses may be sent, giving a maximum displacement of the electrode of 0.050 inch by dialing a single digit. Additional impulses may be sent by dialing additional digits. By this means, any desired spacing may be obtained within approximately 0.0025 inch.

While a telephone dial switch has been described and shown as a means for sending pulses to the electrode moving device to determine a desired spacing between the members to be spaced, it will be evident that other means for supplying pulses may be employed instead, for example a tone control system using a bank of push buttons, or other system for providing timed electronic pulses.

While an illustrative form of apparatus and a method in accordance with the invention has been described and shown herein, it will be understood that numerous changes may be made without departing from the general principles and scope of the invention.

I claim:

1. Apparatus for remote control of the spacing between two electrically conductive members, comprising, in combination, first electrically energizable means for moving one said member toward the other, a control relay, said relay having a plurality of normally closed contacts and another plurality of normally open contacts, means to energize said first member moving means through a first said normally closed contact, a power source for said relay, an electrically operable indicating device, a first said normally open contact in a series circuit including said power source, said indicating device and said relay winding, means connecting one terminal of said first normally open contact to one said member to be spaced and connecting the other terminal to the other said member by way of a second said normally closed contact, said first normally open contact being adjusted to be closed by the operation of the relay before the said second normally closed contact opens, whereby upon contact between said members to be spaced said relay and said indicating device are energized and said relay is made self-holding through said first normally open contact and said member moving means is disconnected by the opening of said frst normally closed contact, second electrically energizable means for moving said one member away from contact, a stepping switch, means including a third said normally open contact for connecting electrical power to said second member moving means through said stepping switch to move said member away from contact by a predetermined spacing, and means to remove power from said relay winding to restore the system to normal.

2. The method of positioning a welding electrode with reference to a workpiece, which method comprises the steps of connecting electrical contact detecting means between said welding electrode and said workpiece, moving said electrode toward said workpiece by remote control means, stopping said movement of the electrode upon detection of electrical contact between said electrode and workpiece, indicating said contact by means actuated by said contact detecting means, upon said indication moving said electrode away from the workpiece to a predetermined position to establish a desired spacing between said electrode and workpiece appropriate to a given welding operation, and disconnecting said contact detecting means from said electrode and workpiece before impressing welding power across between said electrode and workpiece to perform the said welding operation.

3. The method of welding a workpiece that is enclosed in a closed vessel out of sight and reach of the welding operator, which method comprises the steps of by remote control connecting electrical contact detecting means between a welding electrode within said vessel and the workpiece, actuating by remote control electrode-moving apparatus within said vessel to move said electrode toward the workpiece, stopping said movement of the electrode upon detection of electrical contact between said electrode and workpiece, indicating said contact by means actuated by said contact detecting means, which indicating means is observable outside said vessel, actuating said electrode-moving apparatus by remote control to move said electrode away from the workpiece to establish a desired spacing between said electrode and workpiece appropriate to a welding operation, disconnecting said contact detecting means from said electrode and workpiece, and impressing welding power across between said electrode and workpiece to perform the said welding operation.

4. The method according to claim 3, in which the step of actuating the electrode-moving apparatus to move the electrode away from the workpiece comprises stepping the electrode away from the workpiece by a predetermined number of discrete steps.

5. Apparatus for remote control of the spacing between a welding electrode and a workpiece, comprising, in combination, means to vary the spacing between said electrode and said workpiece, electrical remote control means for operating said spacing varying means, said remote control means being operable by means of a train of electrical pulses and having first and second control elements for receiving said pulses for increasing and decreasing respectively said spacing, means for impressing a train of pulses upon said space decreasing control element to cause sustained movement of said means, thereby to decrease said spacing, means actuated by electrical contact between said electrode and said workpiece to stop said movement of said spacing means upon said contact, and means for impressing a train of predetermined number of pulses upon said space increasing control element to separate said electrode and workpiece by a desired spacing.

6. Apparatus in accordance with claim 5, in which said welding electrode, said workpiece, said spacing varying means and said electrical remote control means for operating said spacing varying means are contained in a closed vessel, electrical connection to said first and second control elements extending through the wall of said vessel so as to be accessible outside said vessel, together with electrical conductors temporarily positionable in contact respectively with said welding electrode and said workpiece when conductors extend through the wall of said vessel so as to be accessible to said means to stop the movement of said spacing means, together with means outside said vessel for supplying welding power for said electrode and workpiece, and means to transmit said welding power into the interior of said vessel to said electrode and workpiece.

References Cited

UNITED STATES PATENTS 3,018,357    1/1962    Kramer et al. _____ 219—72
3,254,197    5/1966    Anderson _____ 219—131

BERNARD A. GILHEANY, Primary Examiner

R. N. ENVALL, JR., Assistant Examiner

U.S. Cl. X.R.

219—124, 132, 137